United States Patent
Pogorelik

(10) Patent No.: US 11,900,663 B2
(45) Date of Patent: Feb. 13, 2024

(54) COMPUTER-ASSISTED OR AUTONOMOUS DRIVING TRAFFIC SIGN RECOGNITION METHOD AND APPARATUS

(71) Applicant: Intel Corporation, Santa Clara, CA (US)

(72) Inventor: Oleg Pogorelik, Lapid (IL)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 17/461,864

(22) Filed: Aug. 30, 2021

(65) Prior Publication Data

US 2022/0058405 A1 Feb. 24, 2022

Related U.S. Application Data

(63) Continuation of application No. 16/170,679, filed on Oct. 25, 2018, now Pat. No. 11,106,925.

(51) Int. Cl.
*G06V 20/00* (2022.01)
*G06V 10/82* (2022.01)
(Continued)

(52) U.S. Cl.
CPC .......... *G06V 10/82* (2022.01); *G05D 1/0088* (2013.01); *G06F 16/532* (2019.01); *G06F 18/24143* (2023.01); *G06V 10/764* (2022.01); *G06V 20/582* (2022.01); *G06V 20/584* (2022.01); *G07C 5/0808* (2013.01)

(58) Field of Classification Search
None
See application file for complete search history.

(56) References Cited

U.S. PATENT DOCUMENTS

2010/0283855 A1* 11/2010 Becker ............... G06K 9/00818
  348/148
2015/0193663 A1* 7/2015 Oh ........................ G06K 9/56
  382/104

(Continued)

OTHER PUBLICATIONS

Office Action dated Apr. 30, 2020 for U.S. Appl. No. 16/170,679, 10 pages.

(Continued)

*Primary Examiner* — Adam D Tissot
(74) *Attorney, Agent, or Firm* — Schwabe, Williamson & Wyatt, P.C.

(57) ABSTRACT

Apparatuses, methods and storage medium associated with traffic sign recognition, are disclosed herein. In some embodiments, an apparatus includes an orchestrator, disposed in a CA/AD vehicle, to receive a classification and a location of a traffic sign, while the CA/AD vehicle is enroute to a destination. In response, the orchestrator query a remote sign locator service or a local database on the CA/AD vehicle for a reference description of the traffic sign, determine whether the classification is correct, and output a result of the determination. The classification of the traffic sign is generated based at least in part on computer vision, and the orchestrator includes an anomaly detector to detect anomalies between the classification and the reference description, and determine whether the classification is correct based at least in part on an amount of anomalies detected. Other embodiments are also described and claimed.

29 Claims, 12 Drawing Sheets

(51) Int. Cl.
*G07C 5/08* (2006.01)
*G05D 1/00* (2006.01)
*G06F 16/532* (2019.01)
*G06V 20/58* (2022.01)
*G06F 18/2413* (2023.01)
*G06V 10/764* (2022.01)

(56) References Cited

U.S. PATENT DOCUMENTS

2017/0243483 A1* 8/2017 Kaneshige ............ G06K 9/6281
2019/0325349 A1* 10/2019 Zhang ..................... G06N 5/046

OTHER PUBLICATIONS

Final Office Action dated Aug. 24, 2020 for U.S. Appl. No. 16/170,679, 10 pages.

* cited by examiner

COMPUTER-ASSISTED OR AUTONOMOUS DRIVING TRAFFIC SIGN RECOGNITION METHOD AND APPARATUS

CROSS REFERENCE TO RELATED APPLICATIONS

The present application is a Continuation of U.S. application Ser. No. 16/170,679, filed Oct. 25, 2018 entitled "COMPUTER-ASSISTED OR AUTONOMOUS DRIVING TRAFFIC SIGN RECOGNITION METHOD AND APPARATUS", the contents of which is hereby incorporated by reference in its entirety.

TECHNICAL FIELD

The present disclosure relates to the field of computer-assisted or autonomous driving (CA/AD). More particularly, the present disclosure relates to method and apparatus for traffic sign recognition with adversarial resilience.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

With advances in integrated circuits, sensors, computing and related technologies, increasingly, more and more operations of a vehicle receive computer assistance, from parallel parking, to lane changing, and so forth. Fully autonomous driving vehicles are expected to be generally available to the average consumers very soon. Most of the current computer-assisted or autonomous driving (CA/AD) vehicles are using deep neural networks (DNNs) based object detectors for recognition of traffic signs. Recent studies show that DNNs are vulnerable to adversarial modifications, resulting from intentional malicious modifications as well as small magnitude perturbations, e.g., from dirt added to the traffic signs. As a result, adversarial modifications of traffic signs could mislead in vehicle traffic sign recognition systems and cause dangerous situations.

Today the way to cope with adversarial modification of the traffic signs is based on proper maintenance and/or occasional field reports coming from the drivers. However, controlled check procedures are expensive and not so frequent. Reports coming from public are sporadic and unreliable. Further, humans can check only if the traffic signs are legible for the human drivers. Adversarial sign perturbation are created with people in mind, looking benign and therefore are often barely recognized by humans. Human experts are unable to "imagine" what the traffic sign recognition systems will "think" when observing maliciously modified traffic signs.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
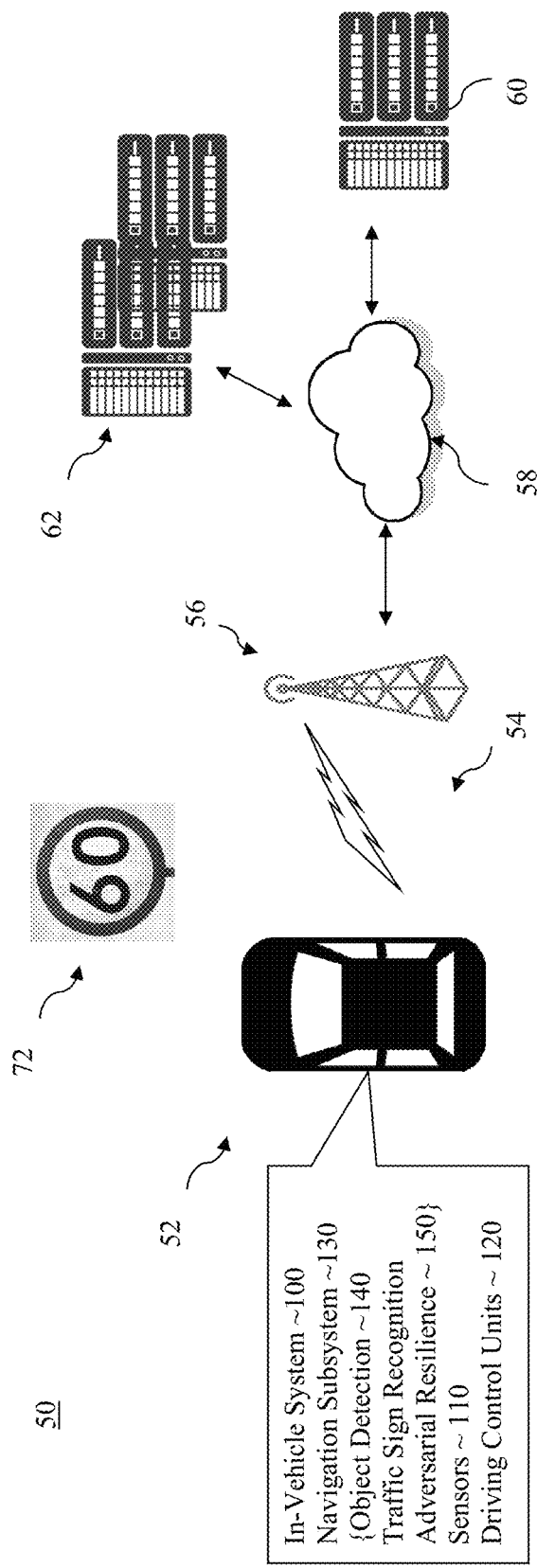
FIG. 1 illustrates an overview of an environment for incorporating and using the traffic sign recognition with adversarial resilience technology of the present disclosure, in accordance with various embodiments.

To address challenges discussed in the background section, apparatuses, methods and storage medium associated with computer-assisted or autonomous driving traffic sign recognition with adversarial resilience, are disclosed herein. In some embodiments, an apparatus for computer-assisted or autonomous driving includes an orchestrator, disposed in a CA/AD vehicle, to receive a classification and a location of a traffic sign, while the CA/AD vehicle is enroute to a destination. In response to the receipt of the classification and the location of the traffic sign, the orchestrator query a remote sign locator service or a local database on the CA/AD vehicle for a reference description of the traffic sign, determine whether the classification is correct, and output a result of the determination. The classification of the traffic sign is generated based at least in part on computer vision, and the orchestrator includes an anomaly detector to detect anomalies between the classification and the reference description, and determine whether the classification is correct based at least in part on an amount of anomalies detected.

In some embodiments, the apparatus is an in-vehicle system disposed on the CA/AD vehicle, the in-vehicle system including a traffic sign adversarial resilience subsystem having the orchestrator. Further, the in-vehicle system includes an object detector coupled with the traffic sign adversarial resilience subsystem to generate the classification of the traffic sign, based at least in part on one or more captured images of the traffic sign.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an overview of an environment for incorporating and using the traffic sign recognition with adversarial resilience technology of the present disclosure, in accordance with various embodiments, is illustrated. As shown, for the illustrated embodiments, example environment 50 includes vehicle 52 having an engine, transmission, axles, wheels and so forth (not shown). Further, vehicle 52 includes in-vehicle system (IVS) 100 having navigation subsystem 130. In addition to navigation subsystem 130, IVS 100 may further include a number of infotainment subsystems/applications, e.g., instrument cluster subsystem/applications, front-seat infotainment subsystem/application, such as, a navigation subsystem/application, a media subsystem/application, a vehicle status subsystem/application and so forth, and a number of rear seat entertainment subsystems/applications (not shown).

Navigation subsystem 130 is configured to provide navigation guidance or control, depending on whether CA/AD vehicle 52 is a computer-assisted vehicle, partially or fully autonomous driving vehicle. In various embodiments, navigation subsystem 130 includes in particular, object detection subsystem 140 and traffic sign recognition adversarial resilience (TSRAR) subsystem 150. Object detection subsystem 140 is configured with computer vision to recognize objects in front of CA/AD vehicle 52, including traffic signs, e.g., traffic sign 72, CA/AD vehicle 52 encounters, as it enroutes to its destination. TSRAR subsystem 150 is configured to provide CA/AD vehicle 52, navigation subsystem 130 of IVS 100 in particular, with improved resilience to adversarial traffic sign (such as traffic sign 72, which is soiled), regardless whether the traffic signs were modified maliciously or unintentionally. Except for TSRAR subsystem 150, navigation subsystem 130, including object detection subsystem 140, may be any one of a number navigation subsystems known in the art. In alternate embodiments, TSRAR subsystem 150 may be disposed outside navigation subsystem 130

In various embodiments, IVS 100, on its own or in response to user interactions, communicates or interacts with one or more off-vehicle remote servers 60 or 62. In particular, IVS 100, for providing traffic sign adversarial resilience, communicates with server 60 associated with a traffic sign service to obtain reference descriptions of traffic signs at various locations. Additionally, IVS 100 may communicate with servers 62, such as servers associated with original equipment manufacturers (OEM) or authorities. Examples of OEM may include, but are not limited to, vendors of components of vehicle 52 or vendor of vehicle 52 itself. Examples of authorities may include, but are not limited to, local or state law enforcement agencies, local or state transportation agencies, and so forth.

In various embodiments, IVS 100 communicates with servers 60/62 via a wireless signal repeater or base station on transmission tower 56 near vehicle 52, and one or more private and/or public wired and/or wireless networks 58. Examples of private and/or public wired and/or wireless networks 58 may include the Internet, the network of a cellular service provider, and so forth. It is to be understood that transmission tower 56 may be different towers at different times/locations, as vehicle 52 enroutes to its destination.

CA/AD vehicle 52, in addition to engine etc. described earlier, and IVS 100, may further include sensors 110 and driving control units 120. Sensors 110 includes in particular one or more cameras (not shown) to capture images of the surrounding of CA/AD vehicles 52, e.g., the surrounding in front of CA/AD vehicles 52. In various embodiments, sensors 110 may also include light detection and ranging (LiDAR) sensors, accelerometers, gyroscopes, global positioning system (GPS), and so forth. Examples of driving control units (DCU) may include control units for controlling engine, transmission, brakes of CA/AD vehicle 52. Except for the traffic sign recognition with adversarial resilience technology provided, CA/AD vehicle 52 otherwise may be any one of a number of CA/AD vehicles, from computer-assisted to partially or fully autonomous vehicles.

These and other aspects of IVS 100 will be further described with references to the remaining Figures. Before doing so, it should be noted that, while for ease of understanding, only one vehicle 52 is shown, the present disclosure is not so limited. In practice, there may be multitude of vehicles equipped with the traffic sign adversarial resilience technology of the present disclosures communicating with one or more traffic sign locator services, multitude of OEMs and/or multitude of authorities. For the purpose of this specification, a CA/AD vehicle may also be referred to as a traffic sign adversarial resilient vehicle or simply vehicle.

Figure 2:
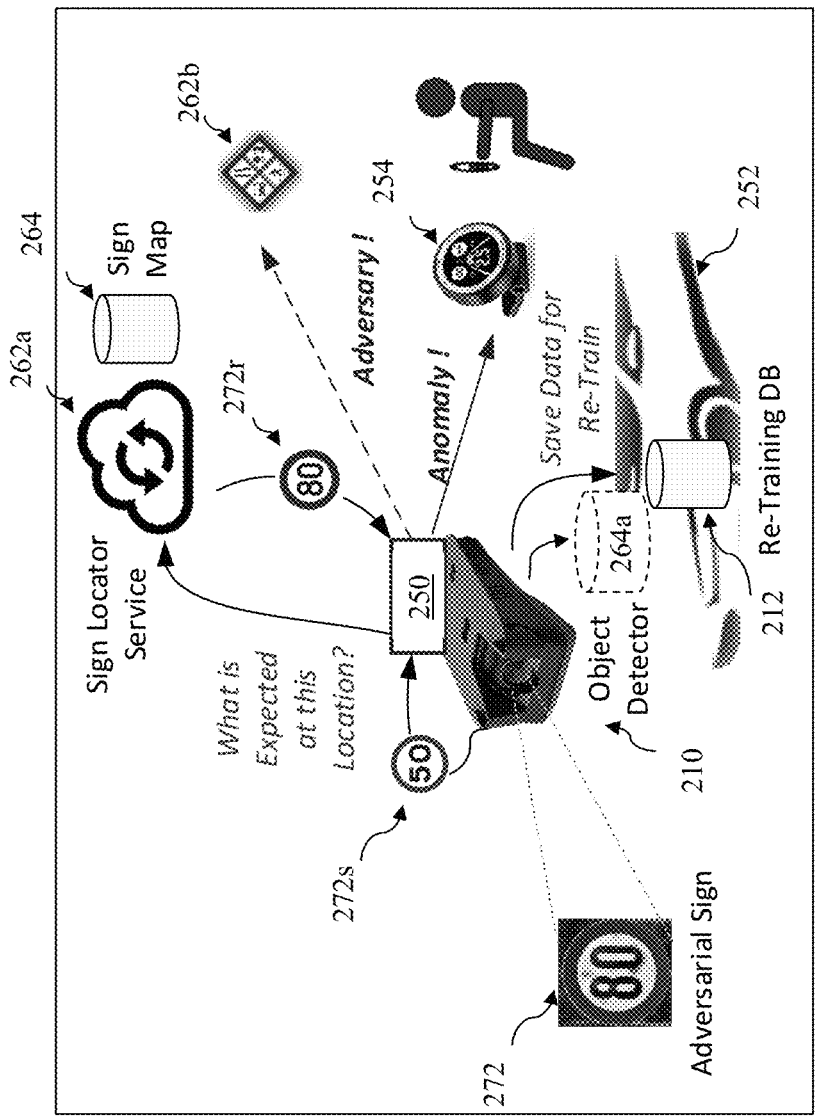
FIG. 2 illustrates an overview of the traffic sign recognition with adversarial resilience technology in further details, according to various embodiments.

Referring now to FIG. 2, wherein an overview of the traffic sign recognition with adversarial resilience technology in further details, according to various embodiments, is shown. As illustrated, vehicle 252, which may be CA/AD vehicle 52 of FIG. 1, is configured with, among other things, object detector 210 and traffic sign recognition adversarial resilience (TSRAR) subsystem 250. Object detector 210 may correspond to object detection subsystem 140, while TSRAR 250 may correspond to TSRAR subsystem 150, of FIG. 1. Shown also in FIG. 2 is adversarial sign 272, a soiled 80 mph speed limit sign, vehicle 252 encounters while enroute to its destination. As illustrated, object detector 210 is affected by the dirt on traffic sign 272 and mistakenly recognize traffic sign 272 as traffic sign 272s, a 50 mph speed limit sign, and output a classification of traffic sign 272 (soiled 80 mph) as mistaken traffic sign 272s (50 mph). While under recognizing allowable speed limit may not be a serious situation, other than potentially causing traffic slow down, object detector 210 could have mistakenly recognize sign 272 as indicating 100 mph as the allowable speed limit, which could create a serious situation.

However, for the illustrated embodiments, TSRAR subsystem 250 is configured to query remote site locator service 262a about the traffic sign at the location. Site locator service 262a is configured with database 264 of traffic signs at various locations (sign maps). In response to the query, site locator service 262a provides the reference traffic sign 272r for the particular location, saying the speed limit is 80 mph, to TSRAR subsystem 250. The information returned from remote site locator service 262a may also be referred to as reference description of traffic sign 272. On receipt of the reference description of the traffic sign at the particular location, TSRARS subsystem 250 compares the traffic sign classification outputted by object detector 210 with the reference description of the traffic sign, to detect for anomalies. In alternate embodiments, a portion of database 264, e.g., of a region or frequently traveled routes, may be optionally cached in a local cache 264a with vehicle 52. For these embodiments, TSRAR subsystem 250 may first check with local cache 264a to determine if the reference description of the traffic sign at the location is available locally, and query site locator service 262a only if the reference description is not available locally.

In various embodiments, on detection of anomalies, TSRAR subsystem 250 notifies an occupant of vehicle 252, e.g., displaying a warning and/or the anomalies on dash 254 of vehicle 252 for the driver/operator of vehicle 252. In various embodiments, on detection of anomalies, TSRARS subsystem 250 may also notify an authority e.g., a local/state law enforcement agency, or a local/state transportation agency, of soiled traffic sign 272. In various embodiments, on detection of anomalies, TSRAR subsystem 250 may also notify an OEM of object detector 210 or OEM of vehicle 252. In particular, TSRAR subsystem 250 may save the detected anomalies in re-training database 212 associated with the OEM for future re-training of object detector 210. In various embodiments, re-training database 212 may be locally disposed in vehicle 252, or remotely disposed away from vehicle 252, with the OEM of object detector 210 or vehicle 252.

Figure 3:
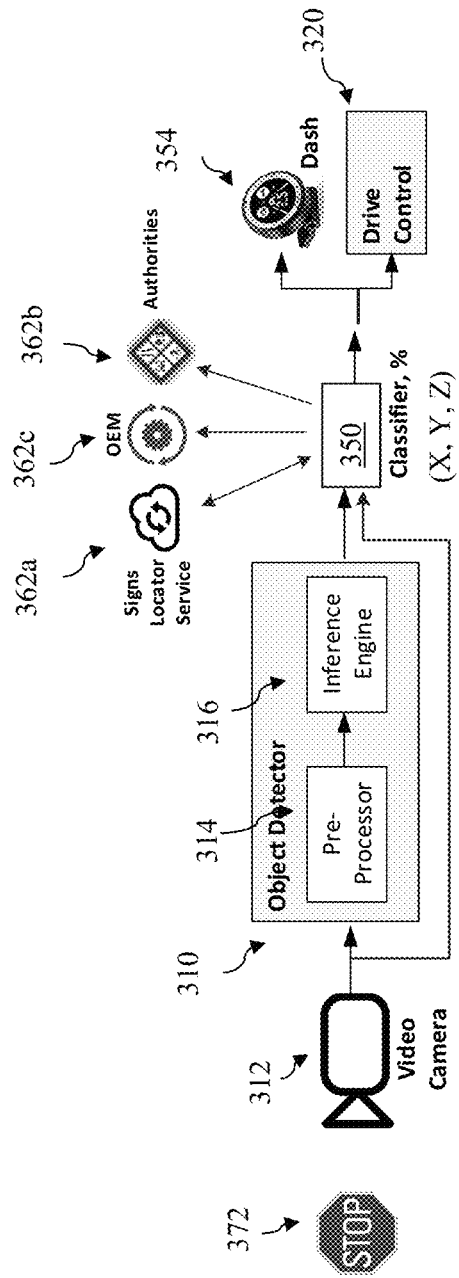
FIG. 3 illustrates another overview of the traffic sign recognition with adversarial resilience technology with still more details, according to various embodiments.

Referring now to FIG. 3, wherein another overview of the traffic sign recognition with adversarial resilience technology with still more details, according to various embodiments, is illustrated. As shown, for the illustrated embodiments, object detector 310 of a CA/AD vehicle, which may corresponds to objector detector 210 of FIG. 2, includes an image pre-processor 314, and an inference engine 316, coupled with each other. Object detector 310 is configured to receive images of the surroundings of the CA/AD vehicle, in particular, the surrounding at the front of the CA/AD vehicle, from video camera 312. Images of the front surrounding may include e.g., traffic sign 372, as CA/AD vehicle encounters the traffic sign, when it enroutes to its destination.

Pre-processor 314 is configured to pre-process the images, e.g., remove noises in the images, sharpen the images, identifies regions of interest for analysis, and so forth. Inference engine 316 may be configured and trained to identify/recognize objects in the images, such as other vehicles, pedestrians, bicycles, and so forth. In particular, inference engine 316 may be configured and trained to identify/recognize traffic signs in the images. In various embodiments, inference engine 316 is configured/trained to output a classification of an identified/recognized traffic sign, together with a confidence level (%). In various embodiments, inference engine 316 is provided with a multi-level neural network to identify/recognize objects, including traffic signs, in the images. An example neural network will be later described with references to FIG. 9.

For the illustrated embodiments, the classification of the identified/recognized traffic sign, together with a confidence level (%) and location coordinates (X, Y, Z) of the traffic sign, are provided to TSRAR subsystem 350, which corresponds to TSRAR subsystems 150/250 of FIG. 1/2. As earlier described, on receipt of the classification, TSRAR subsystem 350 queries remote sign locator service 362a, which may correspond to sign locator service 262a of FIG. 2, for a reference description of the traffic sign at the location. In return, TSRAR subsystem 350 receives the reference description of the traffic sign at the location, from remote sign locator service 362a. On receipt, TSRAR subsystem 350 detects for anomalies between the classification received from object detector 310, and the reference description received from remote sign locator service 362a.

On detection of anomalies, TSRAR subsystem 350 notifies an occupant of the CA/AD vehicle, displaying a warning and/or the anomalies on dash 354 (which may correspond to dash 254 of FIG. 2), notifies one or more authorities 362b (which may correspond to authority 262b of FIG. 2), and/or component/vehicle OEM 362c.

Figure 4:
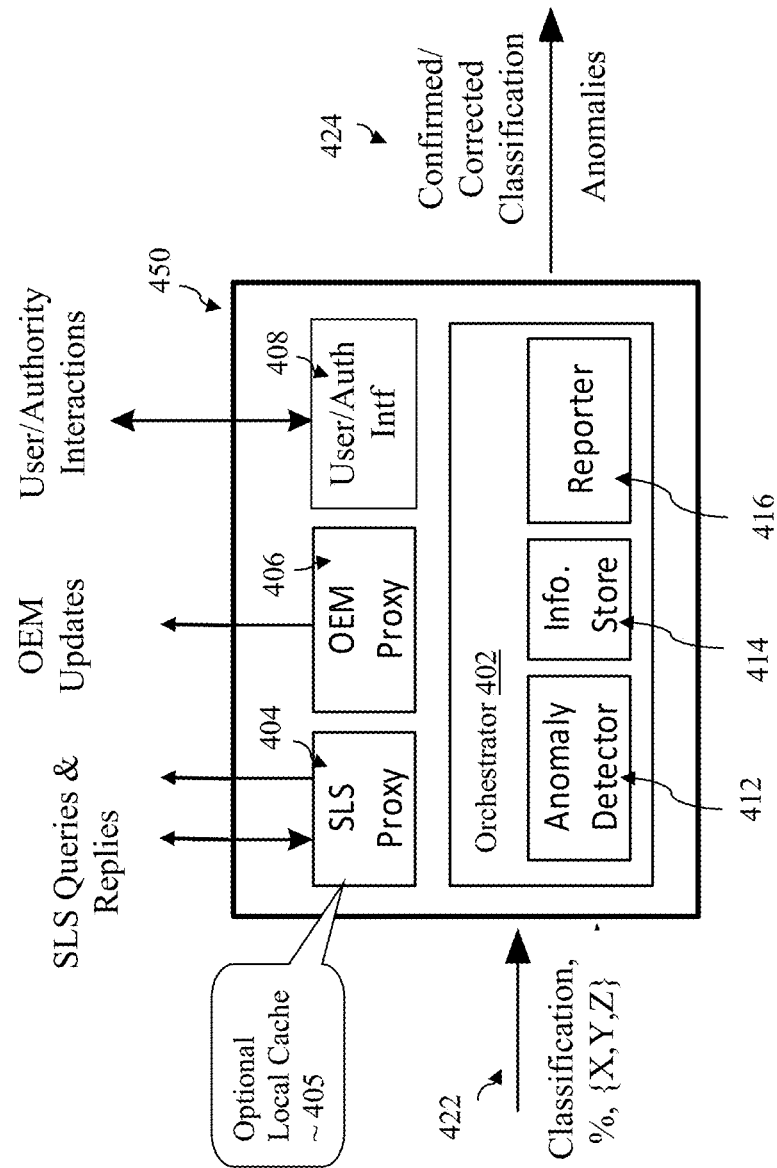
FIG. 4 illustrates a component view of the traffic sign adversarial resilience subsystem, according to various embodiments.

Referring now to FIG. 4, a component view of the traffic sign adversarial resilience subsystem, according to various embodiments, is illustrated. As shown, for the illustrated embodiments, TSRAR subsystem 450 (which might corresponds to TSRAR subsystem 150, 250, or 350 of FIG. 1, 2, or 3), includes orchestrator 402, sign locator service (SLS) proxy 404, OEM proxy 406, and user/authority interface 408. Orchestrator 402 includes anomaly detector 412, information store 414, and reporter 416.

SLS proxy 404 is configured to communicate with a remote SLS, querying the SLS for reference description of a traffic sign at a location, and receiving the requested reference description. OEM proxy is configured to communicate with a component/vehicle OEM, providing the component/vehicle OEM with detected anomalies between the classification of a traffic sign determined by an object detector of the vehicle and the reference classification received from a remote SLS. User/authority interface 408 is configured to interact with a user (an occupant of the vehicle) and an authority, providing the user/authority with warning and/or anomalies detected. In various embodiments, user/authority interface 408 is configured to interact with the user to disambiguate detected anomalies, described more fully below. Each of proxies 404 and 406, and interface 408 may be implemented in hardware, software, or combination thereof.

Orchestrator 402 is configured to cooperate with SLS proxy 404 to query the SLS for reference description of a traffic sign at a location, and receives the reference description, on receipt of a classification 422 of a traffic sign (along with the confidence level and the coordinates (X, Y, Z) of the location of the traffic sign. Orchestrator 402, in particular, anomaly detector 412, is configured to detect for anomalies between classification 422 of a traffic sign determined by an object detector of the vehicle and the reference classification received from a remote SLS. Information store 414 is configured to provide working storage for anomaly detector 412 and reporter 416. In various embodiments, information store 414 may also be configured to cache the reference descriptions of traffic signs of various locations of a region or frequented routes.

Reporter 416 is configured to generate reports to confirm or correct the classification of the traffic sign outputted by the object detector. In various embodiments, reporter 416 is also configured to report the anomalies detected by anomaly detector 412. In particular, reporter 416 is configured to cooperate with OEM proxy 406 and user/authority interface 408, to report the detected anomalies (updates) to the component/vehicle OEM, and/or the user/authority.

In various embodiments, each of orchestrator 402 (including the individual components of anomaly detector 412, reporter 416), SLS proxy 404, OEM proxy 406 and user/authority interface 408 may be implemented in hardware, software or combination thereof. Example hardware implementations may include by are not limited to application specific integrated circuit (ASIC) or programmable circuits (such as Field Programmable Gate Arrays (FPGA)) programmed with the operational logic. Software implementations may include implementations in instructions of instruction set architectures (ISA) supported by the target processors, or any one of a number of high level programming languages that can be compiled into instruction of the ISA of the target processors. In some embodiments, at least a portion of orchestrator 402, e.g., anomaly detector 412, may be implemented in an accelerator. One example software architecture and an example hardware computing platform will be further described later with references to FIGS. 10 and 11. In various embodiments, information store 414 may be implemented with any one of a number of known persistent storage, such as Flash.

Figure 5:
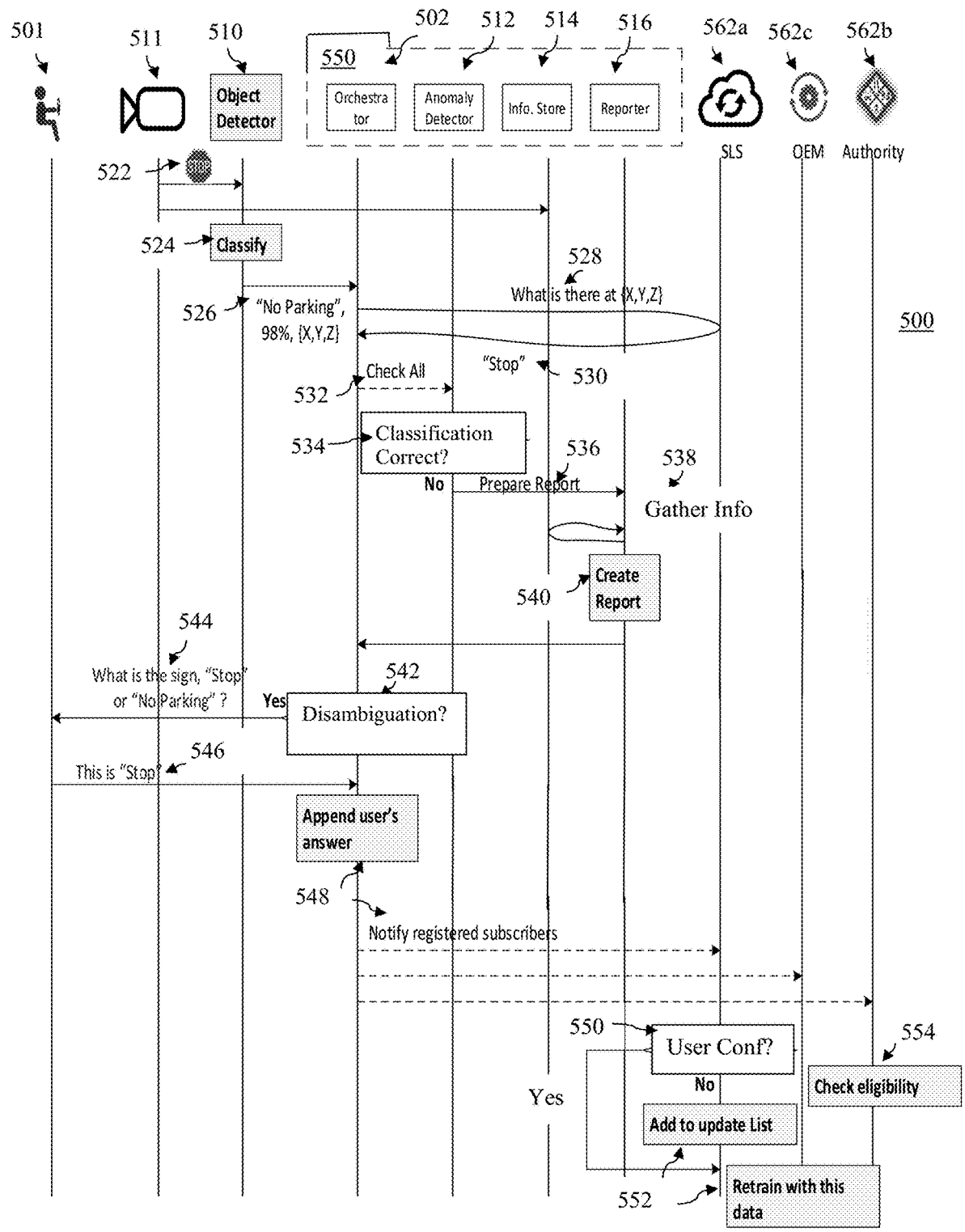
FIG. 5 illustrates an example traffic sign recognition with adversarial resilience process, according to various embodiments.

Referring now to FIG. 5, wherein an example traffic sign recognition with adversarial resilience process, according to various embodiments, is illustrated. As shown, for the illustrated embodiment, process 500 for traffic sign recognition with adversarial resilience include operations 522-552. Operations 522-552 may be performed by cameras 511, object detector 510, orchestrator 502, anomaly detector 512, information store 514, reporter 516, SLS 516a, OEM 516c, authority 516b, which may be camera 312, detector 310/210, orchestrator 402, anomaly detector 412, information store 414, reporter 416, SLS 262a/362a, OEM 362c, authority 262b/362b. Anomaly detector 512, information store 514, and reporter 516 may be part of orchestrator 502, which in turn may be part of TSRAR subsystem 550. TSRAR subsystem 550, object detector 510 and camera 511 are all disposed in a CA/AD vehicle, where user 501 is an occupant, e.g., a driver.

Process 500 may start at 522, with object detector 510 receiving from camera 511, one or more images of a traffic sign encountered by the vehicle enroute to a destination. At 524, using the one or more images, the traffic sign may be classified by object detector 510. At 526, a classification of the traffic sign may be outputted for orchestrator 502, by object detector 510. The classification may include what object detector 510 recognized the traffic sign as, e.g., "No Parking." The classification may be outputted along with the confidence level of objector detector 510, e.g., 98%, as well as the coordinates of the location of the traffic sign (x, y, z).

At 528, reference description of the traffic sign at location (x, y, z) may be queried, e.g., by orchestrator 502 querying SLS 562a. At 530, reference description of the expected traffic sign at the location may be returned, e.g., from SLS 562a to orchestrator 502. In various embodiments, reference descriptions of traffic signs on frequently travel routes may be cached in a local cache, e.g., with SLS proxy or information store 514. For these embodiments, the query may be made to SLS 562a only if the reference description of the currently encountered traffic sign is not cached in information store 514.

Figure 6:
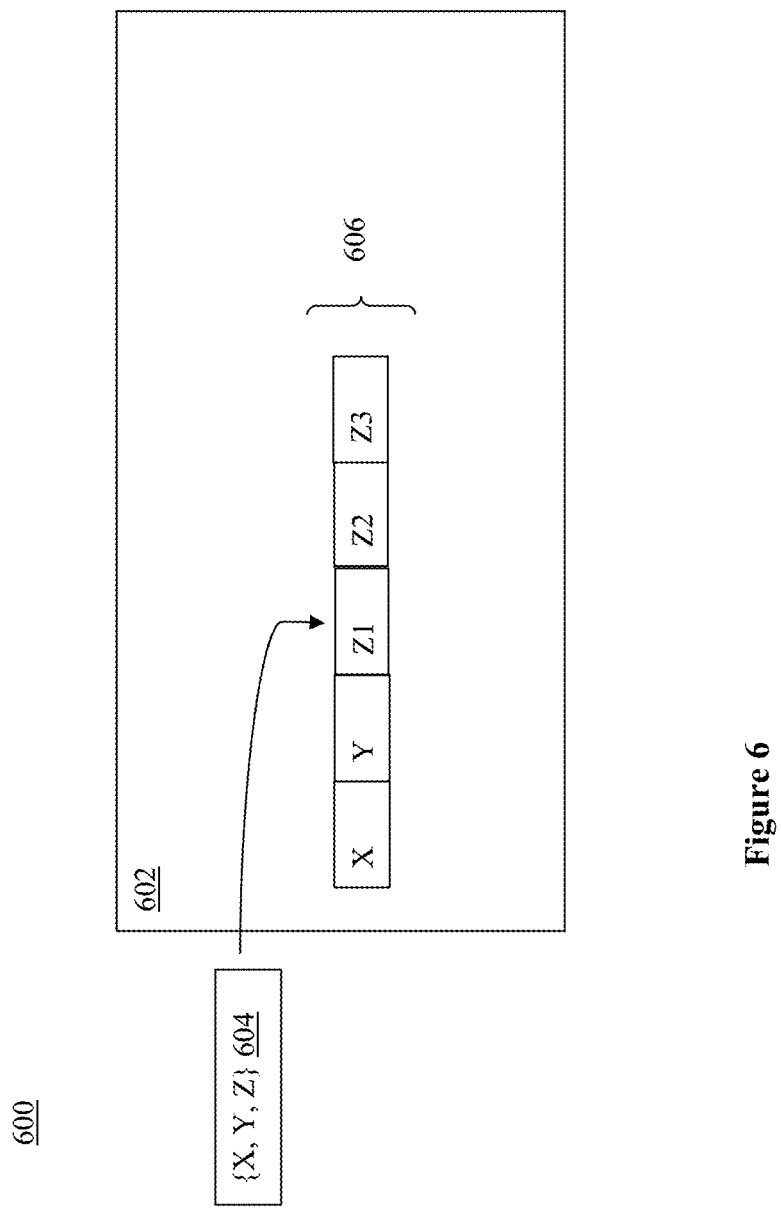
FIG. 6 illustrates an example traffic sign database, according to various embodiments.

FIG. 6 illustrates an example traffic sign database of a SLS, according to various embodiments. Example traffic sign database 600 may include a number of traffic sign records 606 indexed by the (X, Y) coordinates of the locations of the traffic signs. Each record 606, in addition to the X & Y indices include a variable number of data segments for various Z values. Each Z value segment may include the reference description of a traffic sign at the (X, Y, Z) location. Accordingly, the reference description of a traffic sign at (X, Y, Z) location may be accessed using the (X, Y, Z) coordinates as keys and offset into the record.

Referring back to FIG. 5, at 532, a request is made to check whether the traffic sign was classified correctly, e.g., from orchestrator 502 to anomaly detector 512. At 534, an analysis is performed, e.g., by anomaly detector 512, to determine if the traffic sign was classified correctly. At 536, on detection of anomalies, a request is made, e.g., to reporter 516, to prepare a report on the detected anomalies. At 538, all the relevant information are gathered, e.g., by reporter 516, and at 540, the anomaly report is created. In various embodiments, gathering of relevant information may include gathering information on potentially malfunctioning hardware/software components that might have contributed to the anomalies in recognizing the traffic sign. The potentially malfunctioning hardware/software components may be gathered from various sensors, drive control units and/or subsystems of the in-vehicle system. The information may be particularly useful to OEM vendors in determining whether several vehicles of the same type are particularly vulnerable to certain adversarial modifications.

In various embodiments where user assisted disambiguation is supported, process 500 continues at 542. At 542, the process of disambiguation may be started, e.g., by orchestrator 502. At 544, user 501 is requested to assist in disambiguate the traffic sign by orchestrator 502, e.g., by asking user 501 to confirm whether the traffic sign is a "stop" sign or a "no parking sign." At 546, the user's reply, e.g., this is a "stop" sign, may be received. At 548, orchestrator 502 may append the user's answer to the report earlier generated by report 516. On appending the user's answer, orchestrator 502 may notify various registered subscribers, e.g., SLS 562a, OEM 562c, authorities 562b.

Figure 7:
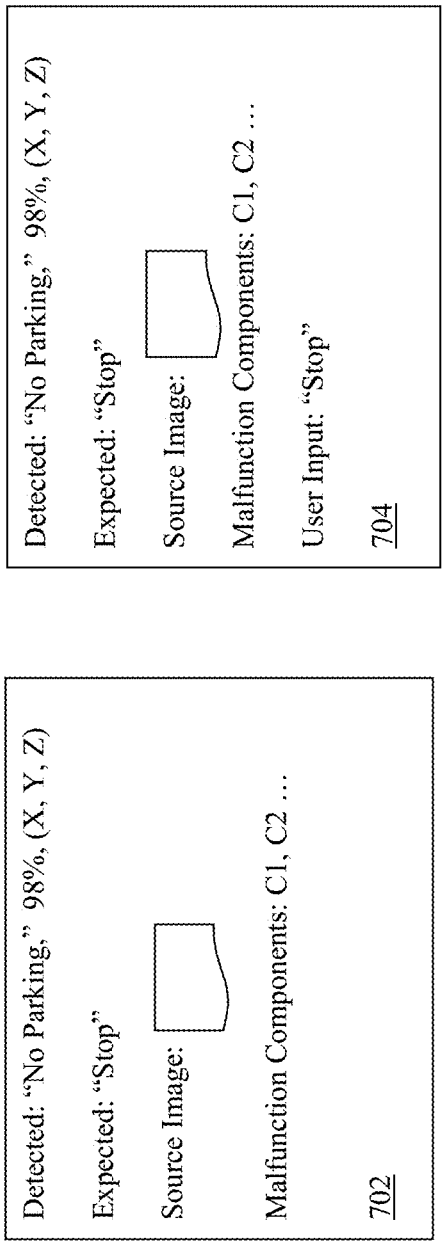
FIG. 7 illustrates an example initial report and an example report augmented with user inputs, according to various embodiments.

FIG. 7 illustrates an example initial report and an example report augmented with user inputs, according to various embodiments. Example initial report 702 may include the classification outputted by the object detector, e.g., "Detected: "No Parking," 98% at (X, Y, Z)," the expected classification "Stop," the source image received from the camera, and potential malfunctioning components. Example augmented report 704, in addition to the above information, may further include the user's input, e.g., "Stop."

Figure 8:
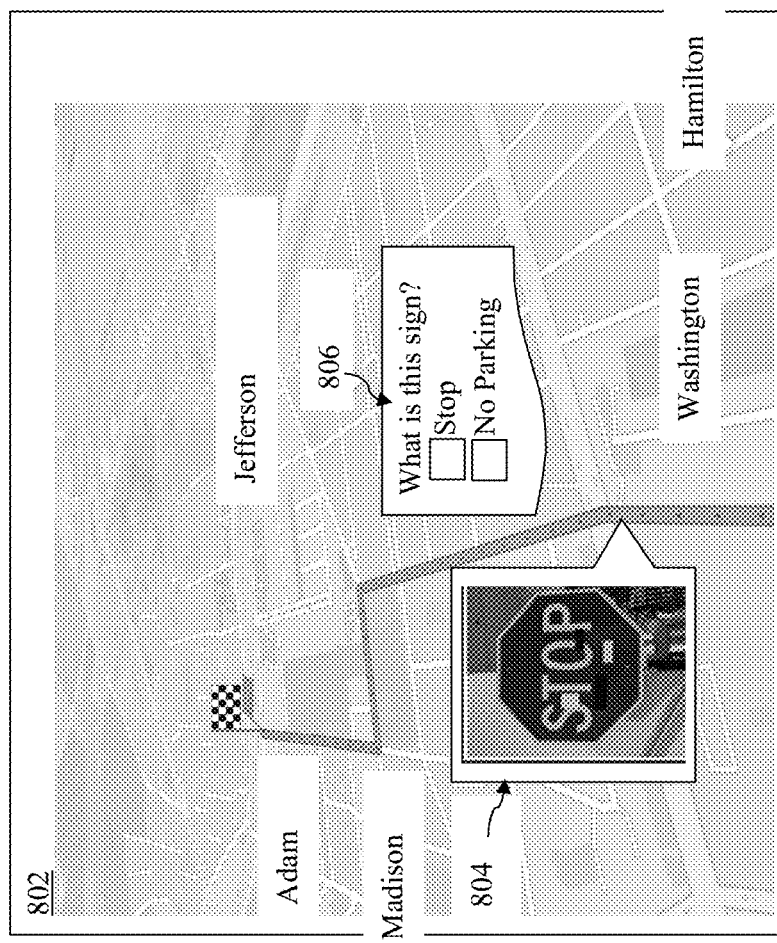
FIG. 8 illustrates an example end user interface for interacting with a user, according to various embodiments

FIG. 8 illustrates an example end user interface for interacting with a user, according to various embodiments.

Example end user interface 802 for interacting with a user may include a number of pop-ups superimposed on a navigation map 802. For example, the pop-ups may include pop-up 804 showing the image of the traffic sign captured by the camera. Additionally, the pop-ups may further include pop-up 806, asking the user to check whether the traffic sign is a "stop" sign as provided by the reference description from the SLS, or it is "No Parking" as classified by the object detector.

Referring back to FIG. 5 again, process 500 may continue at 550-554. At 550, on receipt of the anomaly report, SLS 562a may check to determine if the reference description of the traffic sign at the particular location needs to be updated; if so, update the reference description accordingly. At 552, OEM 562c may retain and add the data to the training data for training new object detectors or re-training existing object detectors. At 554, receiving authority 562b may authenticate the reporting entity, and on authentication of the reliability of the report, act accordingly, e.g., send a maintenance crew to refurnish the traffic sign.

Figure 9:
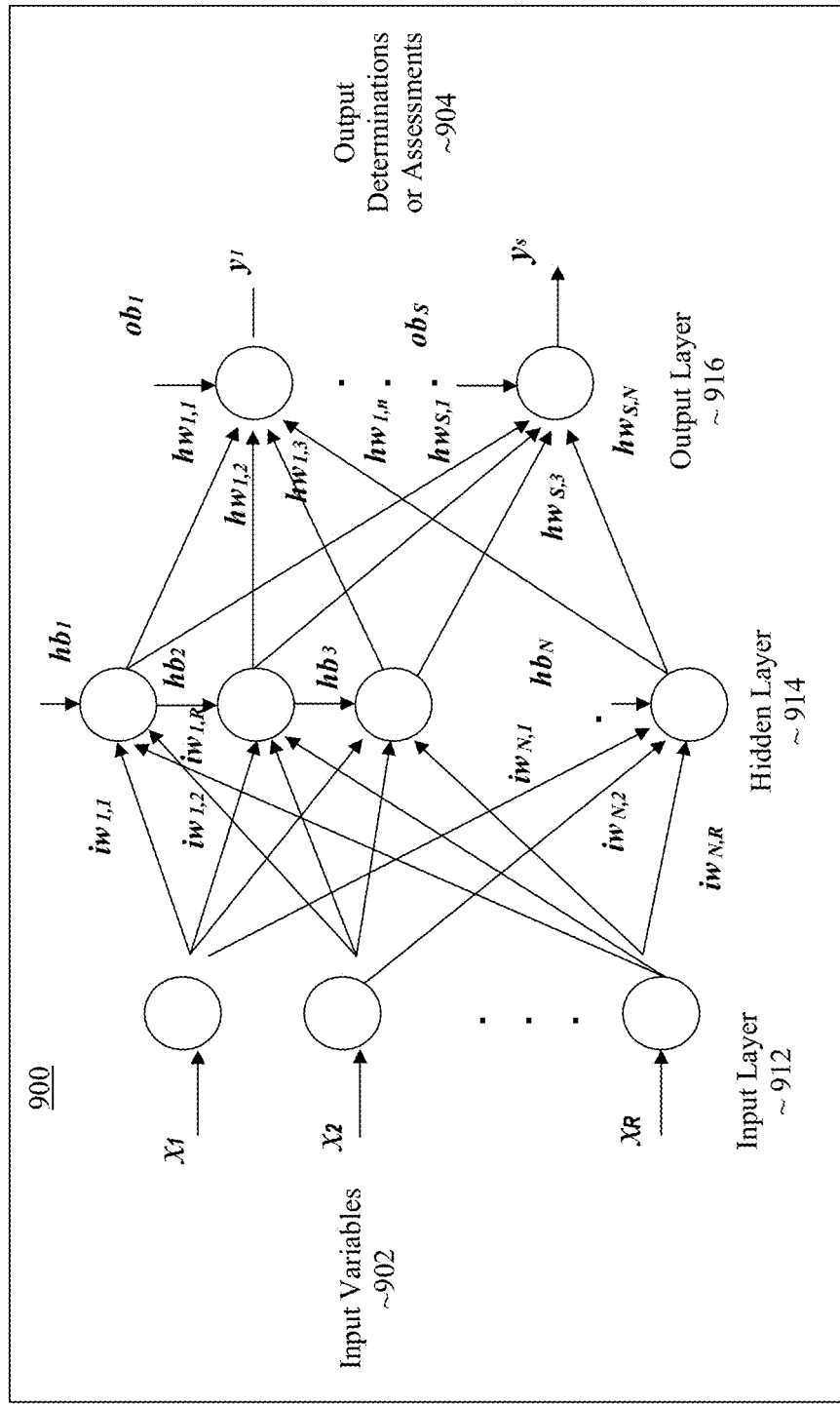
FIG. 9 illustrates an example neural network suitable for use with present disclosure, according to various embodiments.

FIG. 9 illustrates an example neural network, in accordance with various embodiments. Example neural network 900 may be suitable for use by the inference engine of an object detector, e.g., inference engine 316 of object detector 310 of FIG. 3. As shown, example neural network 900 may be a multilayer feedforward neural network (FNN) comprising an input layer 912, one or more hidden layers 914 and an output layer 916. Input layer 912 receives data of input variables (xi) 902. Hidden layer(s) 914 processes the inputs, and eventually, output layer 916 outputs the determinations or assessments ($y_i$) 904. In one example implementation the input variables (xi) 902 of the neural network are set as a vector containing the relevant variable data, while the output determination or assessment ($y_i$) 904 of the neural network are also as a vector.

Multilayer feedforward neural network (FNN) may be expressed through the following equations:

$$ho_i = f(\Sigma_{j=1}^{R}(iw_{i,j}x_j) + hb_i), \text{ for } i=1, \ldots, N$$

$$y_i = f(\Sigma_{k=1}^{K}(hw_{i,k}ho_k) + ob_i), \text{ for } i=1, \ldots, S$$

where $ho_i$ and $y_i$ are the hidden layer variables and the final outputs, respectively. f( ) is typically a non-linear function, such as the sigmoid function or rectified linear (ReLu) function that mimics the neurons of the human brain. R is the number of inputs. N is the size of the hidden layer, or the number of neurons. S is the number of the outputs.

The goal of the FNN is to minimize an error function E between the network outputs and the desired targets, by adapting the network variables iw, hw, hb, and ob, via training, as follows:

$$E = \Sigma_{k=1}^{m}(E_k), \text{ where } E_k = \Sigma_{p=1}^{S}(t_{kp} - y_{kp})^2$$

where $y_{kp}$ and $t_{kp}$ are the predicted and the target values of pth output unit for sample k, respectively, and m is the number of samples.

For inference engine 316, input variables (xi) 902 may include various key data points recognized from the images captured by the camera, and optionally, the readings of the various vehicles sensors, such as accelerometer, gyroscopes, IMU, and so forth. The output variables ($y_i$) 904 may include the classification, the confidence level, and the location coordinates. The network variables of the hidden layer(s) for the neural network of X, are determined by the training data.

In the example of FIG. 9, for simplicity of illustration, there is only one hidden layer in the neural network. In some other embodiments, there can be many hidden layers. Furthermore, the neural network can be in some other types of topology, such as Convolution Neural Network (CNN), Recurrent Neural Network (RNN), and so forth.

Figure 10:
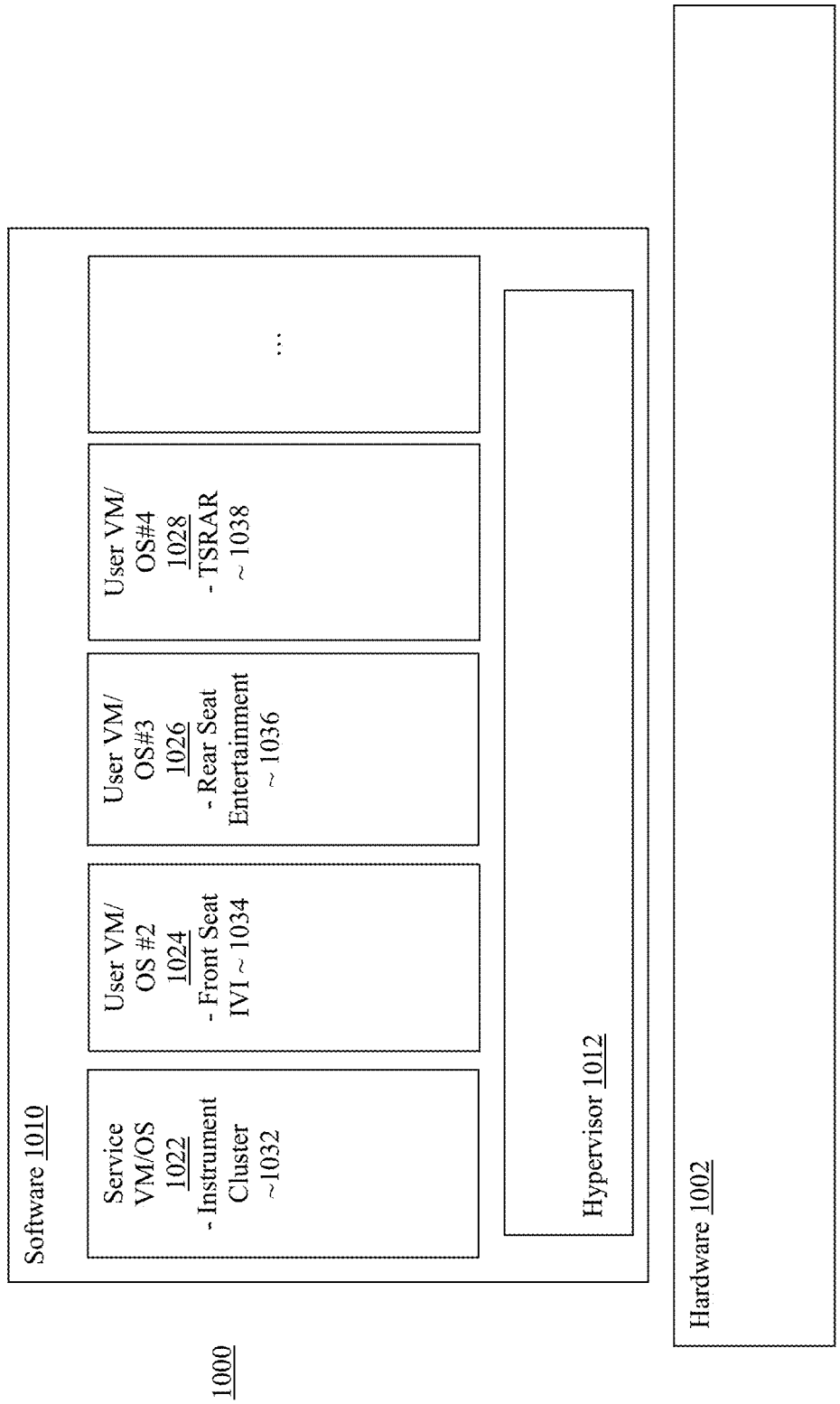
FIG. 10 illustrates a software component view of the in vehicle system, according to various embodiments.

Referring now to FIG. 10, wherein a software component view of the in vehicle system, according to various embodiments, is illustrated. As shown, for the embodiments, IVS system 1000, which could be IVS system 100, includes hardware 1002 and software 1010. Software 1010 includes hypervisor 1012 hosting a number of virtual machines (VMs) 1022-1028. Hypervisor 1012 is configured to host execution of VMs 1022-1028. The VMs 1022-1028 include a service VM 1022 and a number of user VMs 1024-1028. Service machine 1022 includes a service OS hosting execution of a number of instrument cluster applications 1032. User VMs 1024-1028 may include a first user VM 1024 having a first user OS hosting execution of front seat infotainment applications 1034, a second user VM 1026 having a second user OS hosting execution of rear seat infotainment applications 1036, a third user VM 1028 having a third user OS hosting execution of TSRAR subsystem 1038, and so forth.

Except for TSRAR subsystem 1038 of the present disclosure incorporated, elements 1012-1038 of software 1010 may be any one of a number of these elements known in the art. For example, hypervisor 1012 may be any one of a number of hypervisors known in the art, such as KVM, an open source hypervisor, Xen, available from Citrix Inc, of Fort Lauderdale, FL, or VMware, available from VMware Inc of Palo Alto, CA, and so forth. Similarly, service OS of service VM 1022 and user OS of user VMs 1024-1028 may be any one of a number of OS known in the art, such as Linux, available e.g., from Red Hat Enterprise of Raleigh, NC, or Android, available from Google of Mountain View, CA.

Figure 11:
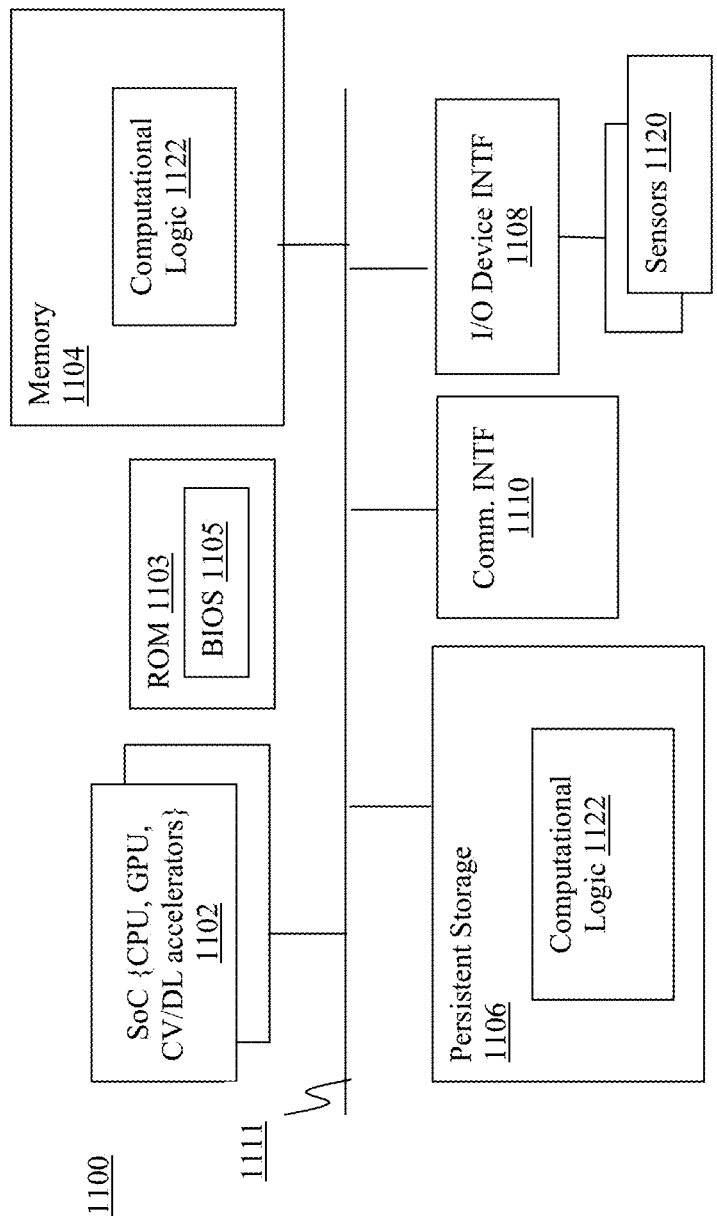
FIG. 11 illustrates a hardware component view of the in vehicle system, according to various embodiments.

Referring now to FIG. 11, wherein an example computing platform that may be suitable for use to practice the present disclosure, according to various embodiments, is illustrated. As shown, computing platform 1100, which may be hardware 1002 of FIG. 10, may include one or more system-on-chips (SoCs) 1102, ROM 1103 and system memory 1104. Each SoCs 1102 may include one or more processor cores (CPUs), one or more graphics processor units (GPUs), one or more accelerators, such as computer vision (CV) and/or deep learning (DL) accelerators. ROM 1103 may include basic input/output system services (BIOS) 1105. CPUs, GPUs, and CV/DL accelerators may be any one of a number of these elements known in the art. Similarly, ROM 1103 and BIOS 1105 may be any one of a number of ROM and BIOS known in the art, and system memory 1104 may be any one of a number of volatile storage known in the art.

Additionally, computing platform 1100 may include persistent storage devices 1106. Example of persistent storage devices 1106 may include, but are not limited to, flash drives, hard drives, compact disc read-only memory (CD-ROM) and so forth. Further, computing platform 1100 may include one or more input/output (I/O) interfaces 1108 to interface with one or more I/O devices, such as sensors 1120. Other example I/O devices may include, but are not limited to, display, keyboard, cursor control and so forth. Computing platform 1100 may also include one or more communication interfaces 1110 (such as network interface cards, modems and so forth). Communication devices may include any number of communication and I/O devices known in the art. Examples of communication devices may include, but are not limited to, networking interfaces for Bluetooth®, Near Field Communication (NFC), WiFi, Cellular communication (such as LTE 4G/5G) and so forth. The elements may be coupled to each other via system bus 1111, which may represent one or more buses. In the case of multiple buses, they may be bridged by one or more bus bridges (not shown).

Each of these elements may perform its conventional functions known in the art. In particular, ROM 1103 may include BIOS 1105 having a boot loader. System memory 1104 and mass storage devices 1106 may be employed to store a working copy and a permanent copy of the programming instructions implementing the operations associated with hypervisor 112, service/user OS of service/user VM 1022-1028, and components of TSRAS subsystem 1038 (such as orchestrator 402 (or its components anomaly detector 412, reporter 416), SLS proxy 404, OEM proxy 406, user/authority interface 408, and so forth), collectively referred to as computational logic 922. The various elements may be implemented by assembler instructions supported by processor core(s) of SoCs 1102 or high-level languages, such as, for example, C, that can be compiled into such instructions.

Figure 12:
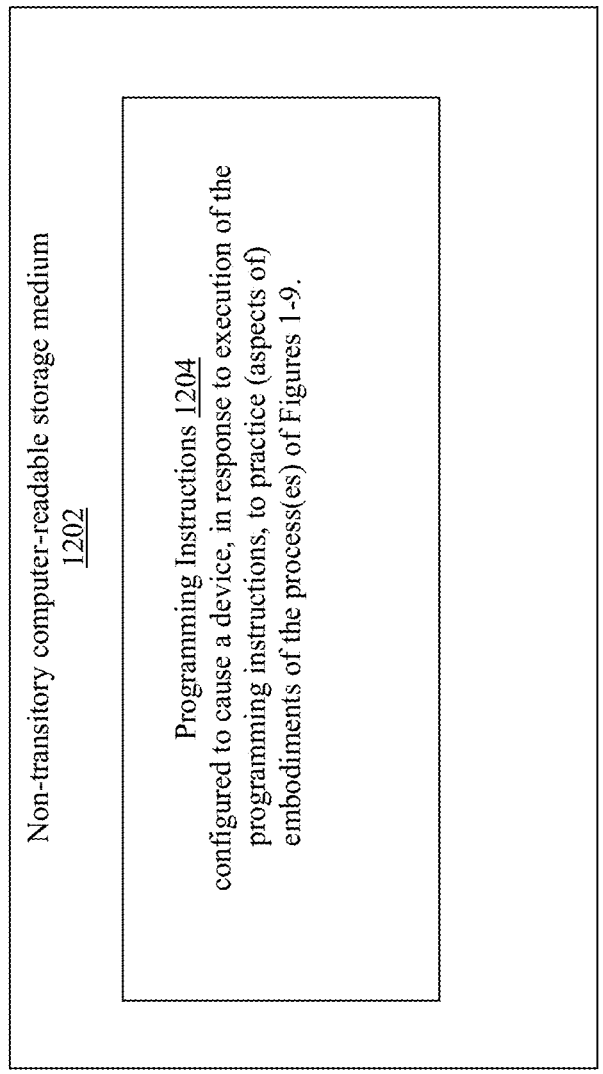
FIG. 12 illustrates a storage medium having instructions for practicing methods described with references to FIGS. 1-9, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 12 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1202 may include a number of programming instructions 1204. Programming instructions 1204 may be configured to enable a device, e.g., computing platform 1100, in response to execution of the programming instructions, to implement (aspects of) hypervisor 112, service/user OS of service/user VM 122-128, and components of TSRAS subsystem 1038 (such as orchestrator 402 (or its components anomaly detector 412, reporter 416), SLS proxy 404, OEM proxy 406, user/authority interface 408, and so forth). In alternate embodiments, programming instructions 1204 may be disposed on multiple computer-readable non-transitory storage media 1202 instead. In still other embodiments, programming instructions 1204 may be disposed on computer-readable transitory storage media 1202, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 is an apparatus for computer-assisted or autonomous driving (CA/AD), comprising: an orchestrator, disposed in a CA/AD vehicle, to receive a classification and a location of a traffic sign, while the CA/AD vehicle is enroute to a destination, and in response to the receipt of the classification and the location of the traffic sign, query a remote sign locator service or a local database on the CA/AD vehicle for a reference description of the traffic sign, determine whether the classification is correct, and output a result of the determination; wherein the classification of the traffic sign is generated based at least in part on computer vision, and the orchestrator includes an anomaly detector to detect anomalies between the classification and the reference description, and determine whether the classification is correct based at least in part on an amount of anomalies detected.

Example 2 is example 1, wherein orchestrator further comprise a reporter to prepare a report on a result of the determination, including any anomalies detected, and output the report.

Example 3 is example 2, wherein the report is further arranged to gather information on potential malfunctioning components of the CA/AD vehicle that might have contributed to the anomalies detected, and include the potential malfunction components of the CA/AD vehicle in the report.

Example 4 is example 1, wherein the apparatus is a traffic sign adversarial resilience subsystem disposed on the CA/AD vehicle, the traffic sign adversarial resilience subsystem including the orchestrator; wherein the traffic sign adversarial resilience subsystem further includes a sign locator service proxy coupled with the orchestrator to query the remote sign locator service for the reference description of the traffic sign.

Example 5 is example 4, wherein the sign locator service proxy includes a local cache of a subset of reference descriptions of traffic signs maintained by the sign locator service, and the sign locator service proxy query the remote sign locator service for the reference description of the traffic sign only if the reference description of the traffic sign is not cached in the local cache.

Example 6 is example 1, wherein the apparatus is a traffic sign adversarial resilience subsystem disposed on the CA/AD vehicle, the traffic sign adversarial resilience subsystem including the orchestrator; wherein the result outputted includes anomalies detected, and the traffic sign adversarial resilience subsystem further includes an original equipment manufacturer proxy coupled with the orchestrator to provide an original equipment manufacturer with the anomalies detected.

Example 7 is example 1, wherein the apparatus is a traffic sign adversarial resilience subsystem disposed on the CA/AD vehicle, the traffic sign adversarial resilience subsystem including the orchestrator; wherein the result outputted includes anomalies detected, and the traffic sign adversarial resilience subsystem further includes a user proxy coupled with the orchestrator to provide an occupant of the vehicle with the anomalies detected.

Example 8 is example 1, wherein the apparatus is a traffic sign adversarial resilience subsystem disposed on the CA/AD vehicle, the traffic sign adversarial resilience subsystem including the orchestrator; wherein the result outputted includes anomalies detected, and the traffic sign adversarial resilience subsystem further includes a user proxy coupled with the orchestrator to interact with an occupant to disambiguate the anomalies detected.

Example 9 is example 1, wherein the apparatus is an in-vehicle system disposed on the CA/AD vehicle, the in-vehicle system including a traffic sign adversarial resilience subsystem having the orchestrator; wherein the in-vehicle system further includes an object detector coupled with the traffic sign adversarial resilience subsystem to generate the classification of the traffic sign, based at least in part on one or more captured images of the traffic sign.

Example 10 is example 9, wherein the in-vehicle system comprises a hardware platform having a system-on-chip (SoC) arranged to host a plurality of virtual machines, with one of the plurality of virtual machines arranged to host the traffic sign adversarial resilience subsystem.

Example 11 is example 10, wherein the SoC includes a hardware accelerator, and the anomaly detector of the orchestrator is implemented in the hardware accelerator.

Example 12 is example 1, wherein the apparatus is the CA/AD vehicle having an in-vehicle system, the in-vehicle system having a traffic sign adversarial resilience subsystem that includes the orchestrator; wherein the CA/AD vehicle further includes one or more cameras coupled to the in-vehicle system to capture one or more images of the traffic sign, the in-vehicle system further including an object detector coupled with the traffic sign adversarial resilience subsystem to generate the classification of the traffic sign, based at least in part on the one or more images of the traffic sign captured.

Example 13 is a method for in-vehicle traffic sign recognition comprising: receiving, by a traffic sign recognition adversarial resilience subsystem (TSRARS) disposed in a CA/AD vehicle, a classification and a location of a traffic sign, while the CA/AD vehicle is enroute to a destination; receiving, by the TSRARS, a reference description of the traffic sign at the location; determining, by the TSRARS, whether the classification is correct; and outputting, by the TSRARS, a result of the determination; wherein the classification of the traffic sign is generated based at least in part on computer vision, and determining includes detecting for anomalies between the classification and the reference description; and wherein whether the classification is determined to be correct is based at least in part on whether an amount of anomalies are detected.

Example 14 is example 13, further comprising: in response to the receipt of the classification and the location of the traffic sign, querying, by the TSRARS, a remote sign locator service or a local database on the CA/AD vehicle for the reference description of the traffic sign.

Example 15 is example 13, further comprising caching a subset of reference descriptions of traffic signs maintained by the remote sign locator service in the local database, and querying comprises querying the local database first for the reference description of the traffic sign, and querying the remote sign locator service for the reference description of the traffic sign only if the reference description of the traffic sign is not cached in the local database.

Example 16 is example 13, further comprising preparing a report on a result of the determination, including any anomalies detected, and output the report, wherein preparing the report includes gathering information on potential malfunctioning components of the CA/AD vehicle that might have contributed to the anomalies detected, and the potential malfunction components of the CA/AD vehicle in the report.

Example 17 is example 16 further comprising sending the report to at least one of the remote sign locator service, an OEM of a component of the CA/AD vehicle or of the CA/AD vehicle, or an authority.

Example 18 is example 13, further comprising interacting with an occupant of the CA/AD vehicle to disambiguate the traffic sign.

Example 19 is at least one computer-readable medium (CRM) having instructions stored therein, to cause a computer-assisted or autonomous driving (CA/AD) vehicle, in response to execution of the instruction by a processor of the CA/AD vehicle, to implement an anomaly detector to detect anomalies between a classification of a traffic sign encountered by the CA/AD vehicle at a location, while enroute to a destination, and a reference description of the traffic sign at the location, and to implement a reporter to report any anomalies detected to at least a selected one of an occupant of the CA/AD vehicle, an original equipment manufacturer (OEM) or a governmental authority.

Example 20 is example 19, wherein the reporter is to gather information on potential malfunctioning components of the CA/AD vehicle that might have contributed to the anomalies detected, and include the potential malfunction components of the CA/AD vehicle in the report.

Example 21 is example 19, wherein the CA/AD vehicle is caused to implement an orchestrator including the anomaly detector and the reporter, and one or more proxies to cooperate with orchestrator to report any detected anomalies to the at least selected one of an occupant of the CA/AD vehicle, an original equipment manufacturer (OEM) or a governmental authority.

Example 22 is example 21, wherein the proxy to report any detected anomalies to an occupant of the CA/AD vehicle is also to interact with the occupant to disambiguate the traffic sign.

Example 23 is example 19, wherein the CA/AD vehicle is further caused to implement a proxy to interface with a remote site locator service to assist the orchestrator in querying and obtaining the reference description of the traffic sign.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus employed as an adversarial resilience subsystem (ARS) for computer-assisted or autonomous driving (CA/AD), comprising:
    an orchestrator to:
        obtain, during operation of a CA/AD vehicle, a classification of a traffic sign, a confidence level associated with the classification, and a location of the traffic sign, wherein the classification of the traffic sign is generated based at least in part on computer vision,
        query a remote sign locator service for a reference description of the traffic sign based on the classification of the traffic sign and the location of the traffic sign, and
        obtain the reference description of the traffic sign from the remote sign locator service, wherein the reference description of the traffic sign is based on a plurality of traffic sign classifications at or near the location of the traffic sign; and
    an anomaly detector to:
        detect anomalies between the classification of the traffic sign and the reference description of the traffic sign, and
        determine whether the classification is correct or incorrect based at least in part on an amount of anomalies detected and the confidence level associated with the classification.

2. The apparatus of claim 1, wherein the anomaly detector is further to:
    determine whether the classification is correct or incorrect based on whether the traffic sign is soiled or modified.

3. The apparatus of claim 1, wherein the anomaly detector is further to:

determine whether the classification is correct or incorrect based on a comparison of the reference description with the classification weighted by the confidence level.

4. The apparatus of claim 1, wherein the anomaly detector is to:
determine that the classification is incorrect when the obtained location of the traffic sign is different than a location of the traffic sign indicated by the reference description.

5. The apparatus of claim 4, wherein the location of the traffic sign comprises geographic coordinates of the traffic sign and a height of the traffic sign.

6. The apparatus of claim 1, further comprising:
an object detector communicatively coupled with the ARS, the object detector is to generate the classification of the traffic sign based at least in part on one or more captured images of the traffic sign.

7. The apparatus of claim 6, wherein the object detector further includes a pre-processor to pre-process the one or more captured images, wherein the pre-processing of the one or more captured images includes one or more of removal of noises in the one or more captured images, sharpening of the one or more captured images, and identification of one or more regions of interest for analysis in individual captured images of the one or more captured images.

8. The apparatus of claim 6, wherein the object detector further includes an inference engine to generate the classification and the confidence level based on the pre-processed one or more captured images.

9. The apparatus of claim 8, wherein the inference engine comprises a neural network configured to obtain the pre-processed one or more captured images as a set of input features, and output the classification, the confidence level, and the location of the traffic sign based on the set of input features.

10. The apparatus of claim 9, wherein the neural network is trained on a training data set, wherein the training data set includes other classifications generated by the neural network or one or more other neural networks.

11. The apparatus of claim 9, wherein the set of input features further include collected sensor data, wherein the sensor data is provided by one or more of an accelerometer, a gyroscope, and an inertial measurement unit (IMU).

12. The apparatus of claim 6, wherein the anomaly detector comprises a neural network trained to detect anomalies in classifications generated by the object detector.

13. The apparatus of claim 1, wherein the ARS further includes a sign locator service proxy coupled with the orchestrator, and the sign locator service proxy is to query the remote sign locator service for the reference description of the traffic sign, and wherein the apparatus further includes a local cache configured to store a subset of reference descriptions of traffic signs maintained by the sign locator service, and the sign locator service proxy is to query the remote sign locator service for the reference description of the traffic sign only if the reference description of the traffic sign is not cached in the local cache.

14. The apparatus of claim 1, wherein the reference description is another classification of the traffic sign generated before the obtained classification.

15. The apparatus of claim 1, wherein the apparatus is an in-vehicle system disposed in or on the CA/AD vehicle, and the CA/AD vehicle further includes one or more cameras communicatively coupled to the in-vehicle system, the one or more cameras to capture one or more images of the traffic sign.

16. The apparatus of claim 15, wherein the one or more cameras include one or more of a visible light camera and a light detection and ranging (LiDAR) camera.

17. The apparatus of claim 15, wherein the in-vehicle system comprises a hardware platform having a system-on-chip (SoC) arranged to host one or more virtual machines, wherein at least one of the one or more virtual machines is arranged to host the ARS.

18. The apparatus of claim 17, wherein the SoC is communicatively coupled with a hardware accelerator, and the anomaly detector is implemented in the hardware accelerator.

19. The apparatus of claim 1, wherein the apparatus is one or more server computing systems remote from the CA/AD vehicle, the one or more server computing systems comprise respective hardware platforms arranged to host a plurality of virtual machines, wherein at least one of the plurality of virtual machines is arranged to host the ARS, and the one or more server computing systems are communicatively coupled with one or more hardware accelerators, and the anomaly detector is implemented in at least one of the one or more hardware accelerators.

20. A method for operating an adversarial resilience subsystem (ARS), the method comprising:
obtaining, by the ARS, a classification of a traffic sign, a confidence level associated with the classification, and a location of the traffic sign during operation of a CA/AD vehicle, wherein the classification of the traffic sign is generated based at least in part on computer vision;
querying, by the ARS, a remote sign locator service for a reference description of the traffic sign at the location based on the obtained classification of the traffic sign;
obtaining, by the ARS during operation of the CA/AD vehicle, the reference description of the traffic sign, wherein the reference description is based on a plurality of traffic sign classifications at or near the location;
detecting, by the ARS, anomalies between the classification of the traffic sign and the reference description of the traffic sign; and
determining, by the ARS, whether the classification is correct or incorrect based at least in part on an amount of anomalies detected and the confidence level associated with the classification.

21. The method of claim 20, further comprising:
caching, by the ARS, a subset of reference descriptions of traffic signs maintained by a remote sign locator service using a caching system; and
in response to the receipt of the classification of the traffic sign and the location of the traffic sign,
querying the caching system for the reference description of the traffic sign, and
querying the remote sign locator service for the reference description of the traffic sign when the reference description of the traffic sign is not cached in the caching system.

22. The method of claim 20, further comprising:
determining, by the ARS, whether the classification of the traffic sign is correct or incorrect based on a comparison of the reference description with the classification weighted by the confidence level.

23. The method of claim 20, further comprising:
determining, by the ARS, whether the classification of the traffic sign is correct or incorrect based on one or more of whether the traffic sign is soiled or modified and when the obtained location of the traffic sign is different than a location of the traffic sign indicated by the reference description.

24. One or more non-transitory computer-readable media (NTCRM) comprising instructions of an adversarial resilience subsystem (ARS), wherein execution of the instructions by one or more processors of a computing device is to cause the computing device to:
obtain, during operation of a CA/AD vehicle, a classification of a traffic sign, a confidence level associated with the classification, and a location of the traffic sign, wherein the classification of the traffic sign is generated based at least in part on computer vision;
query a remote sign locator service for a reference description of the traffic sign at the location based on the obtained classification of the traffic sign;
obtain the reference description of the traffic sign in response to the query, wherein the reference description is based on a plurality of traffic sign classifications at or near the location;
detect anomalies based on a comparison of the reference description with the classification of the traffic sign and the location of the traffic sign; and
determine whether the classification is correct or incorrect based at least in part on an amount of anomalies detected and the confidence level associated with the classification.

25. The one or more NTCRM of claim 24, wherein execution of the instructions is to cause the computing device to operate an object detector to:
generate the classification of the traffic sign based on one or more captured images of the traffic sign; and
generate the confidence level based on a determined accuracy of the generated classification.

26. The one or more NTCRM of claim 25, wherein execution of the instructions is to cause the computing device to operate an object detector to:
operate a pre-processor to pre-process the one or more captured images, wherein the pre-processing of the one or more captured images includes one or more of removal of noises in the one or more captured images, sharpening of the one or more captured images, and identification of one or more regions of interest for analysis in individual captured images of the one or more captured images; and
operate a classification neural network to output the classification, the confidence level, and the location of the traffic sign based on a set of input features, wherein the set of input features includes the pre-processed images.

27. The one or more NTCRM of claim 25, wherein the computing device is an in-vehicle system disposed in or on the CA/AD vehicle, the CA/AD vehicle further includes one or more cameras communicatively coupled to the in-vehicle system, and the one or more cameras are to capture the one or more images of the traffic sign, and wherein the one or more cameras include one or more of a visible light camera and a light detection and ranging (LiDAR) camera.

28. The one or more NTCRM of claim 25, wherein the computing device is one or more server computing systems remote from the CA/AD vehicle, the one or more server computing systems comprise respective hardware platforms arranged to host a plurality of virtual machines, wherein at least one of the plurality of virtual machines is arranged to host the ARS.

29. The one or more NTCRM of claim 28, wherein the one or more server computing systems are communicatively coupled with one or more hardware accelerators, and the one or more hardware accelerators are configured to perform the anomaly detection.

* * * * *